United States Patent
Gorfajn et al.

(10) Patent No.: US 12,244,973 B1
(45) Date of Patent: Mar. 4, 2025

(54) ON-DEVICE MOTION DETECTION

(71) Applicant: Amazon Technologies, Inc., Seattle, WA (US)

(72) Inventors: Julian Gorfajn, Brookline, MA (US); Hendrick Haataja, Somerville, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 18/122,264

(22) Filed: Mar. 16, 2023

(51) Int. Cl.
| | |
|---|---|
| *H04N 7/18* | (2006.01) |
| *G01J 5/00* | (2022.01) |
| *G06T 7/246* | (2017.01) |
| *G06V 10/764* | (2022.01) |
| *G06V 10/82* | (2022.01) |
| *G06V 20/52* | (2022.01) |
| *G06V 40/10* | (2022.01) |
| *H04N 23/65* | (2023.01) |

(52) U.S. Cl.
CPC ............ *H04N 7/188* (2013.01); *G01J 5/0025* (2013.01); *G06T 7/248* (2017.01); *G06V 10/764* (2022.01); *G06V 10/82* (2022.01); *G06V 20/52* (2022.01); *G06V 40/10* (2022.01); *H04N 7/186* (2013.01); *H04N 23/651* (2023.01); *G01J 2005/0077* (2013.01); *G06T 2207/20081* (2013.01); *G06T 2207/20084* (2013.01); *G06T 2207/30196* (2013.01); *G06T 2207/30232* (2013.01)

(58) Field of Classification Search
CPC ...... H04N 7/188; H04N 7/186; H04N 23/651; G01J 5/0025; G01J 2005/0077; G06T 7/248; G06T 2207/20081; G06T 2207/20084; G06T 2207/30196; G06T 2207/30232; G06V 10/764; G06V 10/82; G06V 20/52; G06V 40/10
See application file for complete search history.

(56) References Cited

U.S. PATENT DOCUMENTS

| | | | |
|---|---|---|---|
| 11,257,226 B1* | 2/2022 | Solh | G06F 18/22 |
| 11,900,706 B1* | 2/2024 | Qian | G06V 10/776 |
| 11,922,642 B1* | 3/2024 | Setzer | G06T 7/277 |
| 11,922,697 B1* | 3/2024 | Xu | G06V 10/44 |
| 12,136,294 B1* | 11/2024 | Thayer | G06V 40/166 |
| 2015/0318015 A1* | 11/2015 | Bose | G08B 21/043 386/248 |
| 2016/0322078 A1* | 11/2016 | Bose | G11B 20/10527 |
| 2017/0169679 A1* | 6/2017 | Johnson | G08B 13/08 |
| 2022/0116535 A1* | 4/2022 | Gaw | G06T 7/277 |
| 2024/0257521 A1* | 8/2024 | Sastry | H04N 23/61 |

* cited by examiner

*Primary Examiner* — Fernando Alcon
(74) *Attorney, Agent, or Firm* — K&L Gates LLP

(57) ABSTRACT

Systems and techniques are described for motion detection. In various examples, a camera device may initiate execution of a non-computer vision-based motion detection process. In some examples, the camera device may initiate execution of a computer vision-based classification process during the execution of the non-computer vision-based motion detection process. In various examples, first result data may be determined by the non-computer vision-based motion detection process. In various examples, the execution of the computer vision-based classification process may be terminated based at least in part on the first result data.

21 Claims, 5 Drawing Sheets

ON-DEVICE MOTION DETECTION

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository.

DETAILED DESCRIPTION

Figure 1:
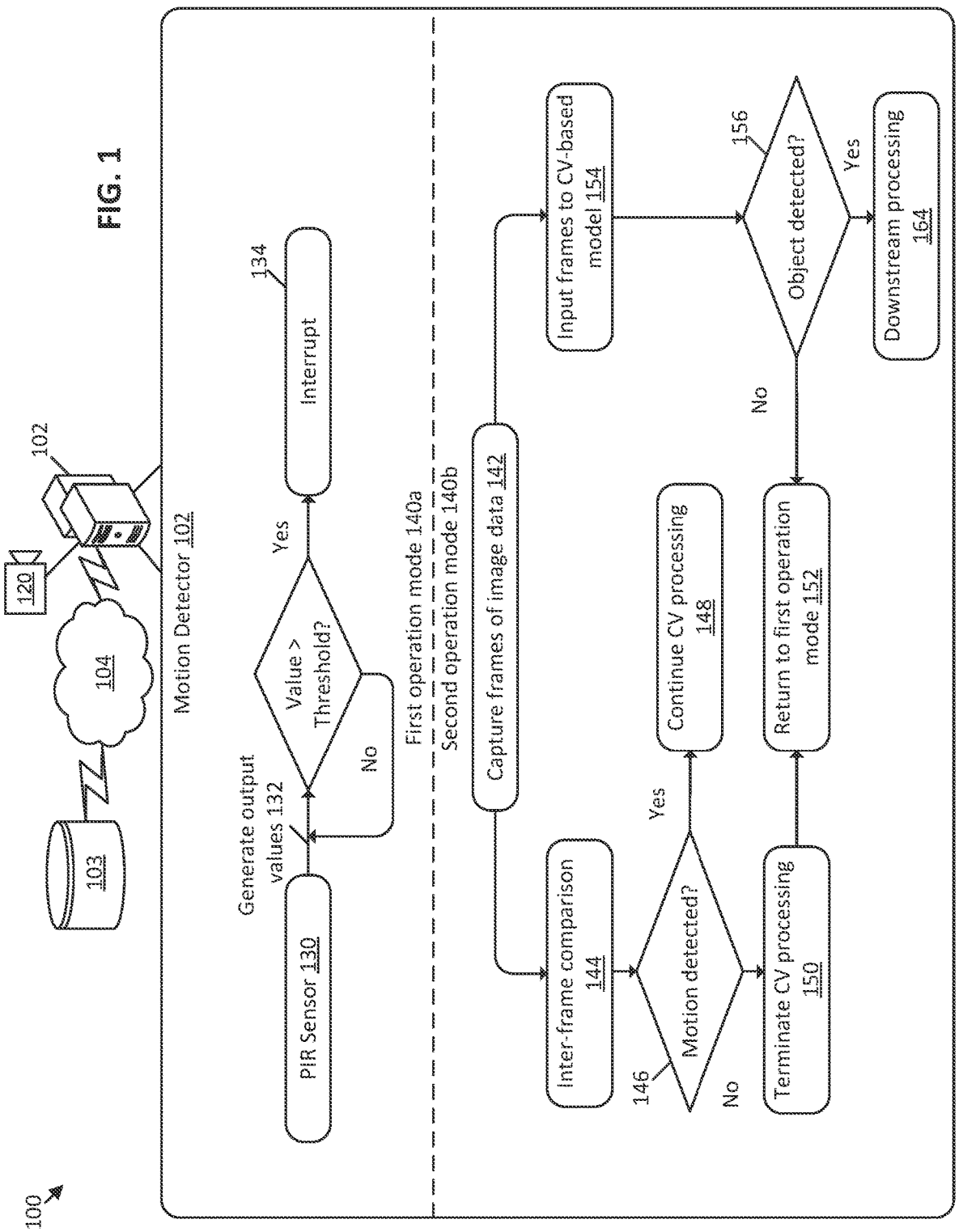
FIG. 1 is a diagram illustrating a motion detector configured in communication with a camera device, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system. In various examples, camera devices may be battery-powered for ease of installation and to avoid unsightly power cords. In various other examples, camera devices may be powered through a wired interface (e.g., through "mains" power from a wall socket). In at least some examples, camera devices may include motion sensors to detect motion. In some examples, camera devices may be operated in a low power state (sometimes referred to as "sleep" mode) prior to detection of motion. In some examples, when motion is detected, the camera device may be controlled to begin capturing, encoding, and/or streaming video to one or more other devices (e.g., a video processing device) for storage, display, and/or processing. For example, the contents of a rolling buffer of captured image data may be encoded and sent to another device followed by a stream of video captured by the camera while motion is detected. Advantageously, waiting until motion is detected prior to capturing and/or streaming image data and/or video data may prolong battery life (and minimize power consumption) by capturing, encoding, and/or streaming video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that transmission of video data results in a quicker consumption of battery power and more frequent battery replacement. In various examples, video data may refer to one or more sequential frames of image data.

In some examples, insignificant motion may trigger a motion sensor of a camera device, which may, in turn, cause the camera device to begin capturing and/or streaming video even though the video may not be of interest to a user. Accordingly, it may be beneficial to limit the number of such "false positives" where insignificant motion results in video capture and/or streaming, which, in turn, may lead to increased power consumption and depletion of battery power. For example, an outdoor camera device may include a motion sensor with a "field-of-view" (e.g., the area monitored by the motion sensor) that includes a tree outside of a user's home. In the example, the motion sensor may be triggered each time that the wind blows and the leaves of the tree are rustled. The triggering of the motion sensor may, in turn, cause the camera device to capture and/or stream video. In another example, a motion sensor may be triggered each time a pet moves within the field-of-view (FOV) of the motion sensor. In another example, a motion sensor may be triggered by cloud movement and sunlight changes due to passing clouds. Various systems and techniques described herein may be effective to prevent triggering of video capture and/or streaming due to inconsequential motion that is not likely to be of interest to a user.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor. PIR sensors often include two sensor "halves" and/or multiple sensor regions. A multi-facet lens breaks light received from a scene into multiple regions and projects these regions on to the different halves or regions of the sensor. The sensor integrates the black body radiation detected in the two halves (or in the multiple regions, depending on the sensor) and determines the differential change. The differential change is the difference in detected radiation between the two sensor halves (or between the different regions). If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by a light source of the sensor. Accordingly, PIR sensors consume relatively little power when in use.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC) (e.g. output from the ADC or output generated based on output from the ADC).

An electronic device may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor).

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PIR data (e.g. a most recent data value at the time of polling) from the IC component. For example, the controller may poll the IC component at a rate of 64 Hz. In accordance with one or more preferred implementations, the logic signal represents an interrupt that triggers additional processing based on radar data and PIR data as described herein.

In some example systems, if motion is detected in an environment monitored by a motion sensor such as a PIR sensor, the triggered motion sensor may send a signal to one or more camera devices associated with the motion sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may be configured to begin capturing video.

However, the triggering of a PIR sensor (e.g., a PIR sensor detecting a motion event) may rely on tunable thresholds (e.g., a threshold magnitude of differential change between the halves of a PIR sensor). If such thresholds are set too high, motion events of interest may be missed without the camera being triggered. Conversely, if such thresholds are set too low, insignificant motion events (e.g., leaves blowing in the wind, raindrops, etc.) may cause the camera device to be triggered, resulting in the camera capturing video of events that are unlikely to be of interest to the user and potentially causing information fatigue (where the user is unlikely to pay attention to video feeds from the camera due to a large number of false positives).

Additionally, PIR sensors may have difficulties distinguishing between motion that is likely to be of interest to a user and motion that is relatively inconsequential and unlikely to be of interest to a user. For example, an outdoor PIR may trigger based on sunlight that is filtered through a tree as the wind blows the leaves of the tree and different amounts of radiation are detected by different regions and/or halves of the PIR sensor. Additionally, in scenarios where the target objects to be detected are people at relatively short distances (e.g., a PIR sensor in a video-enabled doorbell camera), large, non-target objects at greater distances, like cars passing on a street, can cause false triggering of the PIR sensor. Additionally, PIR sensors often have difficulty detecting motion when the motion is directly toward or away from the PIR sensor, as the radiation from such objects may not pass between different sensor halves and/or sensor regions and thus may not trigger the PIR sensor. To account for this difficulty, the sensitivity of the PIR sensor may be increased, which in turn, may lead to increased false triggering due to distant non-target motion.

Other forms of motion sensing may be used to corroborate motion detected by a PIR sensor to help eliminate false triggering in PIR motion-sensing systems that are highly power constrained. In various examples described herein, after a PIR sensor detects a motion event, a camera device may be controlled to begin capturing image data. Once two or more usable frames (e.g., after automatic white-balancing to correct the exposure, etc.) are obtained, a non-machine-learning (ML) motion detection algorithm may be executed in parallel (or partially in parallel) with a computer vision (CV) ML-based object detector. In various examples, ML-based object detection processing may take longer than the non-ML-based motion detection algorithm to return a result. Accordingly, in various examples described herein, if the non-ML-based motion detection algorithm returns a negative result (indicating that no motion is detected), the ML-based object detection processing may be terminated and the camera device may be returned to a low-power state with PIR motion monitoring. In various examples, while in the low-power state, the camera device may not capture image data. Terminating the ML-based object detection processing when the non-ML-based motion detection algorithm does not detect motion may conserve power and thus prolong battery life of battery-powered camera devices. Conversely, if the non-ML-based motion detection algorithm returns result data indicating motion, the ML-based object detection processing may be continued. If an object of a predefined class is detected in the captured images (e.g., a person or other object class of interest) the camera device may be controlled to encode and stream video data to one or more remote devices (e.g., to a mobile device for playback and/or to a backend server for storage and/or later playback). For example, if the ML-based object detection processing detects a person at a confidence level above a threshold confidence level, the system may begin encoding and/or transmitting image data to a remote device (and/or an alert may be generated indicating that motion has been detected). In various examples, if greater than a threshold amount of time passes without detecting a person (or other object of interest) by the ML-based object detection processing with a confidence level above a confidence threshold, (e.g., >4 seconds or some other suitable amount of time), the camera device may be transitioned back to the low-power state with PIR monitoring.

Initiation of the ML-based object detection and the non-ML-based motion detection in parallel (or at least partially concurrently) may result in lower latency, multi-stage motion detection. In situations where the non-ML-based motion detection returns a negative result, the parallel processing may consume additional power due to the ML-based object detection processing performed prior to termination (even though there may not have been any event or object of interest). However, in situations where the non-ML-based motion detection returns a positive result, the ML-based object detection provides a result more quickly (relative to a situation in which the ML-based object detection processing is initiated only after the non-ML-based motion detection returns a positive result), thereby enabling a user to more quickly see the detected motion event.

Machine learning techniques, such as the ML-based motion detection techniques described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram illustrating a system 100 including a motion detector 102 configured in communication with a camera device 120 and one or more non-transitory computer-readable memories 103, in accordance with various aspects of the present disclosure. In various examples, the computing device(s) implementing motion detector 102 may be configured in communication over a network 104. Although depicted as separate components in FIG. t, the motion detector 102 may be part of the camera device 120. In some examples, the motion detector 102 may be implemented in one or more chips of camera device 120. For example, one or more of the techniques used by the motion detector 102 may be performed using an application specific integrated circuit (ASIC) and/or using a field programmable gate array (FPGA). In some other examples, various techniques of the motion detector 102 may be instantiated in software executed by one or more processors of the camera device 120 and/or of the motion detector 102. In yet other examples, the motion detector 102 may be instantiated using some combination of hardware and software. In various examples, the camera device 120 may be a battery-powered camera device. However, in at least some other examples, the camera device 120 may be wired to mains and/or may use mains power with a battery back-up.

Network 104 may be a communication network such as a local area network (LAN), a wide area network (such as the Internet), or some combination thereof. The one or more computing devices implementing the motion detector 102 may communicate with non-transitory computer-readable memory 103 (e.g., either locally or over network 104). The non-transitory computer-readable memories 103 may store instructions that may be effective to perform one or more of the various techniques described herein.

As shown in FIG. 1, motion detector 102 may comprise a PIR sensor 130. Nominally, motion detector 102 may operate in a first operation mode 140a. During first operation mode 140a the PIR sensor 130 may generate output samples (e.g., output values 132 at 64 samples per second or some other frequency, depending on the desired implementation) representing output magnitude of the PIR sensor 130. The output values 132 may be compared to a tunable threshold value. If an output value 132 (and/or a combination or average of output values 132, depending on the implementation) has a magnitude that exceeds the threshold value this may be indicative of possible motion and an interrupt 134 may be generated. An interrupt 134 generated due to PIR sensor 130 detecting motion may cause the motion detector 102 to transition from the first operation mode 140a to the second operation mode 140b. In at least some examples, the first operation mode 140a may consume less power than the second operation mode 140b. Accordingly, the first operation mode 140a may, in some cases, be referred to as a "low-power" or "lower powered" state (sometimes referred to as "sleep" mode). Similarly, the second operation mode 140b may be referred to as a "higher-powered state" (relative to the first operation mode 140a). Transitioning from the first operation mode 140a to the higher power second operation mode 140b may, in some cases, be referred to as "waking up" the camera device 120.

During the second operation mode 140b, an image sensor and camera of the camera device 120 may be powered and controlled to begin capturing frames of image data (action 142). Although not specifically shown in FIG. 1, automatic white balancing (AWB), color correction, gamma correction, and/or other image processing operations may be performed to configure the camera device 120 upon transitioning to the second operation mode 140b and capturing frames of image data. After the camera device is properly configured (e.g., after AWB, color correction, gamma correction, etc., to account for current illumination conditions) the captured frames of image data may be stored in a buffer or other computer-readable memory.

The motion detector 102 may initiate processing of a non-ML-based motion detector (the left branch of second operation mode 140b in FIG. 1) and an ML-based object detector (the right branch of second operation mode 140b in FIG. 1). The processing of the non-ML-based motion detector and the ML-based object detector may be initiated in parallel and/or some offset may be used between initiation of one process and the other. In general, processing of both the non-ML-based motion detector and the ML-based object detector may be initiated such that the processes occur at least partially contemporaneously. ML-based object detection may be more time consuming and may take longer to return a result relative to non-ML-based motion detection approaches. For example, the time taken for some ML-based object detection techniques may be an order of magnitude greater than the time taken for some non-ML-based motion detection techniques described herein. Accordingly, the result of the non-ML-based motion detection techniques may be returned before the ML-based object detection processing has returned a result.

In the example of FIG. t, the non-ML-based motion detection processing includes an inter-frame comparison 144 action. For example, after properly configuring the camera device for current illumination, two or more frames of image data may be captured by the camera device 120. A first frame may be compared against a second frame to determine differences between the first frame and the second frame. Differences may be determined at the pixel level and/or by comparing blocks of pixels (sometimes referred to as macroblocks). Comparing the frames at the block level may reduce the computational complexity and may therefore consume less power and reduce latency. For example, a sum of squared differences (SSD), a sum of absolute differences (SAD), a sum of absolute transformed differences (SATD), etc., may be used to determine the difference between the image data in the first frame and image data in the second frame. Large differences (e.g., difference values exceeding a threshold value) may indicate motion between the first frame (e.g., an image captured at a first time) and the second frame (e.g., an image captured at a second time). Accordingly, at action 146, result data (e.g., a result of the inter-frame comparison action 144) may be generated. If the result data indicates that motion is detected between the frames being compared, the CV-processing pipeline (e.g., the ML-based object detector), which is executing at least partially in parallel, may be continued (action 148). Conversely, if no motion is detected (or no motion is detected for a particular amount of time and/or particular number of inter-frame comparisons), processing may continue to action 150, at which CV processing (e.g., ML-based object detector processing) may be terminated. For example, an interrupt may be generated that causes the ML-based object detector processing to be terminated and causes the motion detector 102 to return to first operation mode (action 152). The intuition for terminating the ML-based object detection processing may be that, since the inter-frame comparison 144 has returned a negative result (e.g., no motion detected), there is unlikely to be an object-of-interest (e.g., a person, vehicle, animal, etc.) within the captured image frame. Terminating the ML-based object detector processing may conserve battery life of the camera device 120.

While the inter-frame comparison 144 processing is ongoing, one or more captured frames of image data 142 may be input into a ML-based machine learning model (e.g., a ML-based object detector) at action 154. The ML-based machine learning model may be trained (e.g., using supervised machine learning techniques) to detect objects-of-interest in input image data. For example, the ML-based machine learning model may be trained to detect humans in the image frame and may generate a bounding box or segmentation mask that specifies the location of the detected human(s) in the image frame. The ML-based machine learning model may comprise a convolutional neural network (CNN), a visual transformer, an autoencoder, a recurrent neural network, etc., in accordance with the desired implementation. Various example ML-based object detection techniques are described in further detail below, for illustrative purposes.

As previously described, if the non-ML-based motion detection (e.g., the inter-frame comparison 144) returns a negative result (indicating that no motion is detected) while the ML-based object detector is processing, the ML-based object detector processing may be terminated prior to completion to conserve battery life. In such examples, an interrupt may be generated that causes the motion detector 102 to transition from the second operation mode 140b to the first operation mode 140a (e.g., powering down the camera and/or image signal processor of the camera device 120). However, if the non-ML-based motion detection (e.g., the inter-frame comparison 144) returns a positive result (indicating that motion is detected) while the ML-based object detector is processing, the ML-based object detector processing may be permitted to continue. At action 156, if an object-of-interest is detected downstream processing 164 may be initiated. The specifics of the downstream processing 164 are dependent on the desired implementation. However, some examples of downstream processing 164 may include encoding image data and/or video for transmission (e.g., streaming) to a remote computing device, transmitting such data to the remote computing device (e.g., using a transmitter of the camera device 120), generating alert data indicating that motion and/or an object-of-interest has been detected by the camera device 120, sending the alert to a remote computing device, etc.

For example, while the non-ML-based motion detection processing and the ML-based object detector processing are occurring, the camera device 120 may continue to capture video and may store frames of the video in a buffer. Once motion and/or an object-of-interest are detected (e.g., once downstream processing 164 is triggered), the frames in the buffer may be encoded and/or transmitted to a remote computing device. For example, video of the motion/object detection event may be streamed to a user device executing a companion application for the camera device 120.

Figure 2:
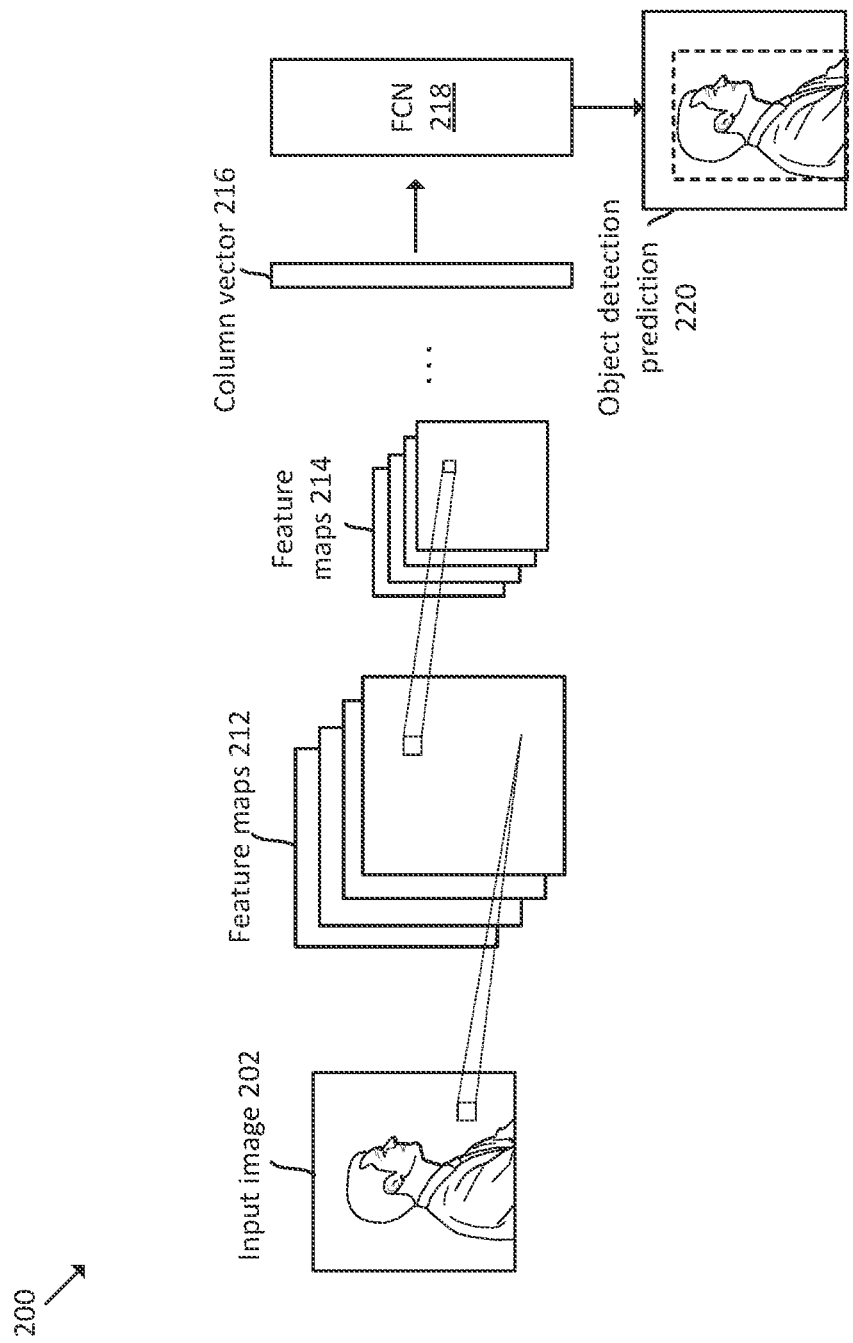
FIG. 2 depicts example processing steps for a computer vision-based object detector, in accordance with various aspects of the present disclosure.

FIG. 2 depicts example processing steps for a computer vision-based object detector 200 (e.g., the ML-based object detection described above in reference to FIG. 1), in accordance with various aspects of the present disclosure. The example ML-based object detection architecture of FIG. 2 is a CNN-based object detector. However, as previously described, any ML-based object detection architecture may be used (e.g., a visual transformer-based object detector, an RNN-based object detector, etc.).

Input image 202 may be a frame of image data captured by camera device 120 (e.g., during second operation mode 140b). The frame of image data may be a two-dimensional grid of pixel values. Additional data may be included with the input image 202 such as histograms representing tonal distribution of the image and/or other image statistics and/or metadata. As shown in FIG. 2, in some examples, a series of convolution filters may be applied to the image to generate feature maps 212. The convolution operation applies a sliding-window filter kernel of a given size (e.g., 3×3, 5×5, etc., in terms of pixel height and width) over the image and computes a dot product of the filter kernel with the pixel values. The output feature map 212 for a single convolution kernel represents the features detected by the kernel at different spatial locations within the input frame of image data. Zero-padding may be used at the boundaries of the input image data to allow the convolution operation to compute values for the columns and rows at the edge of the image frame.

Down-sampling may be used to reduce the size of the feature maps 212. For example, max-pooling may be used to down-sample feature maps 212 to generate reduced-size feature maps 214 (modified feature maps relative to the feature maps 212). Other pooling techniques may instead be used to down-sample feature maps 212 and generate feature maps 214. Generally, pooling involves a sliding window-filter over the feature maps 212. For example, using a 2×2 max-pooling filter, the largest value from a feature map 212 in a given window (at a given frame location) may be used to represent that portion of the feature map 212 in a feature map 214. Max-pooling uses the features with the highest impact on a given window and reduces processing time at subsequent operations. Although not shown in FIG. 2, an activation function may be applied to the reduced size feature maps 214 following the pooling operation. For example, the Rectified Linear Unit (ReLU) activation function or sigmoid function may be applied to prevent diminishing gradients during training of the CNN.

FIG. 2 depicts only a single convolution stage and a single pooling stage. However, any number of convolutions and pooling operations may be used in accordance with the desired implementation. Once the convolution and pooling stages are completed, the ML-based object detector 200 may, in some examples, generate a column vector 216 (e.g., embedding data) from the resulting feature maps by converting the two-dimensional feature maps (e.g., arrays) into one-dimensional vectors. However, in some other examples, the fully-connected layer 218 may be configured to accept two dimensional feature maps 214 as input.

The one-dimensional column vector 216 (representing one or all feature maps 214, depending on the implementation) may be input into a classifier network used to detect an object of a pre-specified class in the input image 202. In some examples, the classifier network (e.g., a machine learning classifier) may be fully-connected network (e.g., a neural network, multi-layer perceptron, etc.) (FCN) 218. However, any other classifier may be used in accordance with the desired implementation. For example, a random forest classifier, a regression-based classifier, a deep learning-based classifier, etc., may be used. In the example of FIG. 2, the FCN 218 may take the one-dimensional column vector 116 representing the input image 202 (or the feature maps 214) as an input and may be trained to generate an object detection prediction 220. In the example of FIG. 2, the ML-based object detector 200 may have been trained to detect humans. Accordingly, the object detection prediction 220 is shown with a bounding box around the person that is shown in the image. The FCN 218 may comprise any number of hidden layers depending on the implementation. In some examples, the FCN 218 may be trained together with the convolutional neural network (CNN) in an end-to-end fashion to detect objects of any number of predefined classes. In at least some other examples, a pre-trained CNN may be used to generate embeddings (e.g., column vectors 216) that may be used as input to the FCN 218 or other classifier. In such examples, the FCN 218 or other classifier may be trained without retraining the CNN. As previously described in FIG. 1, if the ML-based object detector 200 detects an object-of-interest, the camera device 120 may proceed with downstream processing 164, such as encoding and/or transmission of video to one or more remote computing devices.

Figure 3:
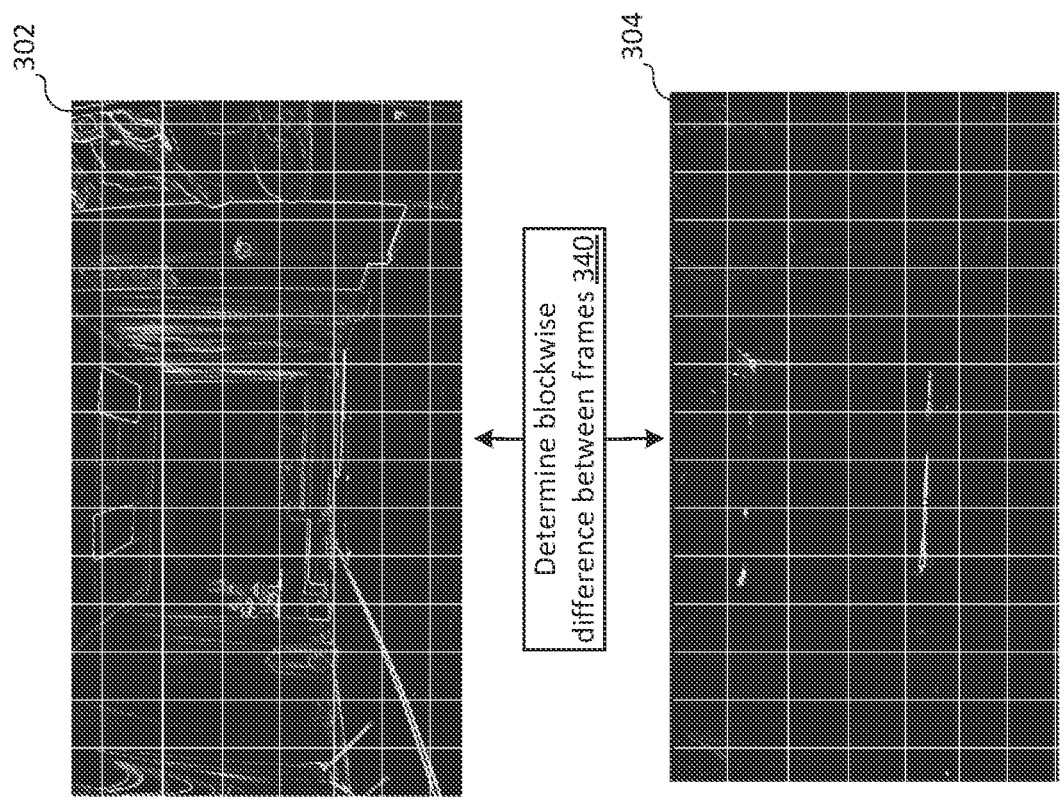
FIG. 3 depicts an example of non-computer vision-based motion detection, in accordance with various aspects of the present disclosure.

FIG. 3 depicts an example of non-computer vision-based motion detection 300, in accordance with various aspects of the present disclosure. As previously described, SSD, SAD, and/or other inter-frame comparison techniques may be used to compare two frames of image data captured by the camera device to detect motion (e.g., by determining a blockwise difference between two frames of image data at action 340). In various examples, frames of image data may be pre-processed prior to motion detection. For example, edge detection may be used to determine various edges appearing in the image prior to motion detection. In at least some examples, detection of edges prior to SAD, SSD, etc., may result in improved accuracy of motion detection. However, in other examples, the images may be compared without first performing edge detection (for example, by comparing macroblocks at corresponding positions in the image frame between a first frame and a second frame or using pixel-wise comparison).

Generally, determining the mean SSD determines a mean spatial difference between two frames of image data. In various examples, a convolution process may be performed using a kernel K to detect peaks in mean SSD and standard deviation of SSD over a relatively short time period (e.g., ~ 2-5 frames or some other number of frames captured in <1 second) in order to detect motion. For example, four frames may be used to determine whether a sudden change in mean SSD and standard deviation has occurred, although more or fewer frames may be used in different implementations. For example, as few as two frames may be used to determine if the mean SSD between the two frames exceeds some threshold value. As described in further detail below, brief peaks in mean SSD and standard deviation are indicative of illumination changes in the scene, while real motion in the scene (e.g., a person walking through a room) typically results in more gradual and irregular changes in mean SSD and standard deviation. Accordingly, various non-ML-based motion detection techniques may be used to distinguish between real motion and scene discontinuity caused by illumination changes and/or compression artifacts.

FIG. 3 depicts two sequential frames of image data captured by a camera device 120. In some examples, frame 302 and frame 304 may be consecutive frames. However, in various other examples, the frame used for non-ML-based motion detection may be non-consecutive. Frame 302a and frame 304a may depict an indoor or outdoor scene.

In the example of FIG. 3, gradient maps have been generated for the input images. However, in other examples, the input images may be directly compared, as previously described. Gradient maps representing frames 302 and 304 may be generated by applying an edge detection algorithm to the input frames. In an example implementation, gradient maps for frames 302 and 304 may be generated by applying the Sobel operator to the input frames. The Sobel operator is a discrete differentiation operator that computes an approximation of the gradient of the image intensity function of the image to which it is applied. The Sobel operator uses two 3×3 kernels $G_x$, $G_y$ which are convolved with the original image to calculate approximations of horizontal changes and vertical changes in the original image data. Convolution is the process of adding each element of the image to its local neighbors, weighted by the kernel. The first kernel $$G_x = \begin{bmatrix} +1 & 0 & -1 \\ +2 & 0 & -2 \\ +1 & 0 & -1 \end{bmatrix}$$

is an operator used to approximate horizontal changes in the original image data (e.g., frames 302 and/or 304). $G_x$ may be applied to pixel values of a frame in the x-direction. The second kernel $$G_y = \begin{bmatrix} +1 & +2 & +1 \\ 0 & 0 & 0 \\ -1 & -2 & -1 \end{bmatrix}$$

is an operator used to approximate vertical changes in the original image data (e.g., frames 302 and/or 304). $G_y$ may be applied to pixel values of a frame in the y-direction. The resulting gradient approximations may be combined to determine the gradient magnitude $$G = \sqrt{G_x^2 + G_y^2}.$$

Although, the Sobel operator is described herein and may offer some advantages in terms of speed, memory requirements and/or the amount of computing resources needed, other edge detection algorithms may instead be used in accordance with the discontinuity detection techniques described herein. For example, the Canny edge detector, differential edge detector, Scharr operator, Prewitt operator, or some other edge detection technique, may be used in accordance with the techniques described herein. As previously described, determining gradient maps prior to comparison of two frames is not necessary for inter-frame comparison motion detection. In various other examples, pixel values and/or average pixel values (e.g., for blocks of pixels) may be used as a basis for inter-frame comparison.

FIG. 3 illustrates separation of the gradient maps into blocks of image data, in accordance with various aspects of the present disclosure. As depicted in FIG. 3, gradient maps of frames 302 and 304 are separated into a number of blocks of pixels (represented by white horizontal and vertical grid lines in FIG. 3). Each block may comprise a location within the frame (e.g., in terms of a block's x, y coordinate position within the frame). Accordingly, a block in frame 302 may be matched to a corresponding block in frame 304. "Corresponding", "matched", and/or "matching" blocks may refer to blocks of pixels which are at the same x, y coordinate position in their respective frames. For example, the top leftmost block of pixels in frame 302 matches the top leftmost block of pixels in frame 304, etc.

A pair of corresponding blocks may be compared between the two frames to determine a difference value that may be indicative of motion. For example, the SSD may be determined for each pair of matching blocks in frames 302 and 304. SSD may be determined by squaring the total difference between the pixel values of two matching blocks. SSD represents the spatial difference between the two matching blocks. Similarly, in some examples, the standard deviation among all SSD values of matching blocks of frames 302, 304 may be determined. Accordingly, for each pair of frames (e.g., frames 302, 304), a mean SSD value and a standard deviation σ may be determined. In various examples, the SSD (or SAD) may be determined without determining or using the standard deviation. As previously described, multiple pairs of frames may be evaluated in accordance with the non-ML-based motion detection techniques described herein. In the following examples, four frames (and four corresponding gradient maps) t, t+1, t+2, and t+3 are described for illustrative purposes. However, another number of frames may be evaluated instead in accordance with the non-ML-based motion detection techniques described herein. When evaluating frames t, t+1, t+2, and t+3, three mean SSD values and three standard deviations may be determined (e.g., one mean SSD and one σ for each of the three frame pairs (t, t+1), (t+1, t+2) and (t+2, t+3)).

In an example, motion may be detected when the mean SSD values and/or the relevant standard deviation values exceed a relevant threshold and/or when these values exceed the relevant thresholds for greater than a predefined number of frames. As previously described, if the non-ML-based motion detection processing returns a negative result indicating that no motion is detected, the ML-based object detection may be terminated prior to completion to conserve battery power. The above-described inter-frame comparison techniques are merely examples of inter-frame comparison techniques that may be used for non-ML-based motion detection. In various examples, any representative pixel value difference and/or block difference between the two frames being compared may be used to detect motion occurring in the scene when comparing two or more frames.

In accordance with one or more preferred implementations, a non-ML-based approach is utilized in which a field of view of an image sensor is divided in to a grid of equally sized rectangles, which can be characterized as zones. For example, in accordance with one or more preferred implementations, a field of view of an image sensor is divided into a 16×16 grid representing 256 activity zones.

In accordance with one or more preferred implementations, a user can disable motion/activity detection for one or more of these zones. In accordance with one or more preferred implementations, a user interface is presented in an app loaded on a user device that displays one or more images (e.g. an image or video) captured by a camera and allows a user to draw a desired detection area on top of the displayed one or more images. Data for such a drawn detection area is then compared to the grid of activity zones to determine which activity zones should be enabled, and which should be disabled.

In accordance with one or more preferred implementations, zone level detection is based on an average pixel value for green pixels within a zone. The average pixel calculation is after exposure, analog gain, lens shading, black level correction, and digital gain but prior to debayering. In accordance with one or more preferred implementations which utilize Gr and Gb pixels, both Gr and Gb pixel values are used.

In accordance with one or more preferred implementations, a process starts by determining, for one or more frames, an average green pixel value for each zone. This can be represented as A [z][f] for zone z and frame f. In accordance with one or more preferred implementations, an average green pixel value is determined for a current frame and a baseline frame. In accordance with one or more preferred implementations, a baseline frame is updated periodically (e.g. once every second) after motion detection is run for that frame.

In accordance with one or more preferred implementations, firmware running on a camera device determines, for each zone z in a baseline frame 0, value A [z][0] indicating an average green pixel value for zone z in frame 0 (which may have been previously determined and stored), and for each zone z in a current frame f, value A [z][f] indicating an average green pixel value for zone z in frame f.

In accordance with one or more preferred implementations, a configuration parameter Tzd is a threshold determined based on a user-configured motion detection sensitivity setting. In accordance with one or more preferred implementations, an enable flag Z [z] for a zone indicates whether the zone is enabled (e.g. based on having a value of 1) or disabled (e.g. based on having a value of 0). In accordance with one or more preferred implementations, enable flag values for zones is determined based on comparing data for such a user-drawn detection area to a grid of activity zones to determine which activity zones should be enabled, and which should be disabled.

In accordance with one or more preferred implementations, for a current frame F, for each zone z (e.g. from z=0 to z=255), a difference is calculated between an average green pixel value A [z][F] for that zone z for the current frame and an average green pixel value A [z][0] for that zone z for the baseline frame 0. This difference value is compared to the configuration parameter Tzd, as well as a negative value of the configuration parameter−Tzd (i.e. Tzd*−1). These comparisons may be a less than comparison, a less than or equal to comparison, a greater than comparison, or a greater than or equal to comparison. These comparisons may also be a comparison that evaluates whether a difference is substantially greater than or substantially less than the threshold, e.g. whether the difference is more than 5× the threshold or whether the difference is more than y above or below the threshold. In accordance with one or more preferred implementations, a parameter CN[z] is determined to be 1 or 0 (or true or false) based on a comparison of a determined difference to −Tzd, and a parameter CP[z] is determined to be 1 or 0 (or true or false) based on a comparison of a determined difference to Tzd.

In accordance with one or more preferred implementations, a parameter CZ[z] is determined for each zone z for the current frame F based on the determined CN[z] value for that zone z, the determined CP[z] value for that zone z, and the corresponding enable flag Z [z] for that zone z. In accordance with one or more preferred implementations, a parameter CZ[z] is determined for each zone z for the current frame F as CZ[z]=Z [z] && (CN[z] | CP[z]).

In accordance with one or more preferred implementations, a CN[z] value equal to 1 or true indicates that the average green pixel value in zone z is significantly less (based on a threshold) in the current frame than it was in baseline frame2, a CP[z] value equal to 1 or true indicates that the average green pixel value in zone z is significantly greater (based on a threshold) in the current frame than it was in baseline frame, and a CZ[z] equal to 1 or true indicates that zone z is enabled and that the average pixel value has changed significantly (based on the thresholds) in the current frame from the baseline frame.

In accordance with one or more preferred implementations, summation or average values are computed for the current frame which sum or average values for each frame. For example, in accordance with one or more preferred implementations, for a current frame F, a total frame negative count value CN for a current frame F is determined based on summing together the CN[z] value for each zone z for frame F, a total frame positive count value CP for a current frame F is determined based on summing together the CP[z] value for each zone z for frame F, and a total frame count value ZD is determined based on summing together the CZ[z] value for each zone z for frame F.

The total frame negative count value CN for the current frame F is compared to a negative change count threshold Tcn, e.g. with a greater than comparison or a greater than or equal to comparison. The total frame positive count value CP for the current frame F is compared to a negative change count threshold Tcp, e.g. with a greater than comparison or a greater than or equal to comparison. The total frame count value ZD is compared to a zone change count threshold Tzd, e.g. with a greater than comparison or a greater than or equal to comparison. These thresholds may be preconfigured or user configured, e.g. based on user-selected sensitivity settings.

In accordance with one or more preferred implementations, a motion detection value or Boolean flag for a current frame F is determined based on the comparison of the total frame negative count value CN for the current frame F to a negative change count threshold Tcn, the comparison of the total frame positive count value CP for the current frame F to a positive change count threshold Tcp, and the comparison of the total frame count value ZD for the current frame F to a zone change count threshold Tcd, e.g. a motion detection value of 1 or Boolean flag of true is determined if all three comparisons return 1 or true.

In accordance with one or more preferred implementations, a counter is incremented when a motion detection value or Boolean flag for a frame F is determined to be 1 or true, and processing then proceeds to a next frame F+1. In accordance with one or more preferred implementations, the counter is reset to zero when a motion detection value or Boolean flag for a frame F is determined to be 0 or false, and processing then proceeds to a next frame F+1. In accordance with one or more preferred implementations, a value of the counter is compared to a consecutive frame count threshold Tc, e.g. with a greater than or greater than or equal to comparison, and a positive result of 1 or true indicates motion detection. Tc may, for example, be set to three frames.

Figure 4:
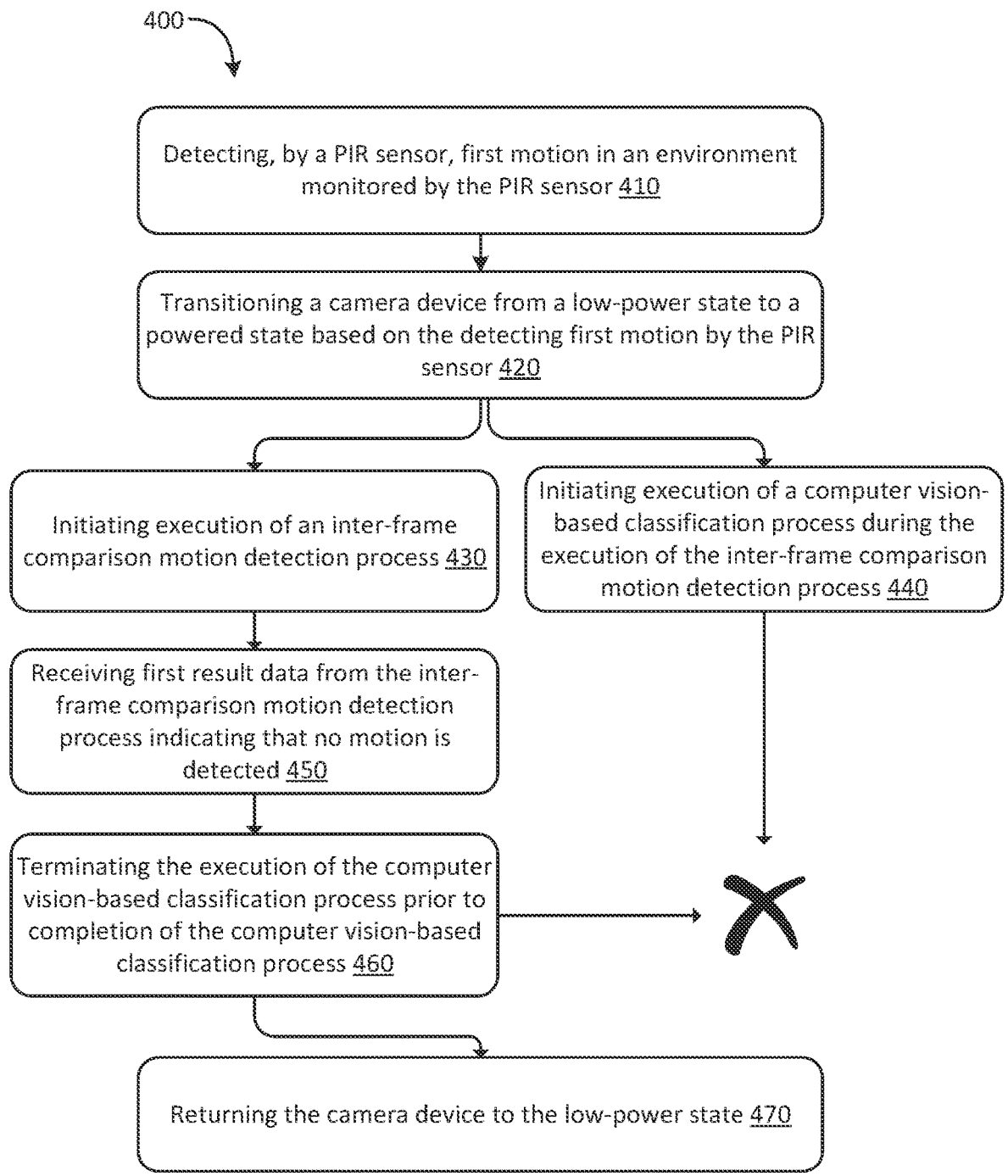
FIG. 4 depicts an example process that may be used to terminate computer vision-based motion detection and return to a low-power camera state, in accordance with various embodiments of the present disclosure.

FIG. 4 depicts an example process 400 that may be used to terminate computer vision-based motion detection and return to a low-power camera state, in accordance with various embodiments of the present disclosure. The actions of the process 400 may represent a series of instructions comprising computer readable machine code executable by a processing unit of motion detector 102 and/or camera device 120, although various operations may be implemented in hardware. In various examples, the computer readable machine codes may be comprised of instructions selected from a native instruction set of the processor(s) and/or an operating system of the computing device.

Process 400 may begin at action 410, at which a PIR sensor may detect first motion in an environment that is monitored by the PIR sensor. For example, PIR values may be generated by a PIR sensor (e.g., PIR sensor 130). The PIR sensor may generate magnitude values representing the difference between different PIR sensor halves or regions. The particular PIR sensor may be associated with a configurable threshold value that may be used to detect motion.

Processing may continue at action 420, at which a camera device (e.g., camera device 120) may be transitioned from a low-power state (e.g., first operation mode 140a) to a powered state (e.g., second operation mode 140b) based on the detection of motion by the PIR sensor. For example, when one or more magnitude values generated by the PIR sensor exceed a relevant threshold an interrupt may be generated that causes a processor (e.g., a processor of the camera device 120) to transition from the low-power sleep mode to a powered mode wherein the camera begins capturing frames of image data and/or storing such captured frames in a rolling buffer or other memory.

Processing may continue at action 430, at which execution of an inter-frame comparison motion detection process may be initiated. For example, two or more frames of image data captured by the camera device 120 may be compared to determine differences between the frames. If the difference value exceeds a threshold value (and/or the difference values between sets of frames is above the threshold value for greater than a predetermined amount of time (e.g., >5 frames or some other desired threshold) a positive result may be determined. Conversely, if the difference between frames is less than a relevant threshold and/or the average difference value over a set of frames is less than the relevant threshold (depending on the particular implementation) a negative result may be determined. Various example implementation details of inter-frame comparison motion detection are described above in reference to FIG. 3. However, as noted above, these implementations are merely examples, and any desired inter-frame comparison motion detection techniques may be used apart from those specifically described.

At action 440, a computer-vision based classification process may be initiated during the execution of the inter-frame comparison motion detection process (e.g., the inter-frame comparison motion detection process of action 430). In some examples, the inter-frame comparison motion detection process of action 430 and the ML-based classification process of action 440 may be initiated in parallel or at least partially in parallel.

At action 450, first result data may be received from the inter-frame comparison motion detection process indicating that no motion is detected by the inter-frame comparison motion detection process (e.g., a negative result may be returned). Upon determining the first result data from action 450, processing may proceed to action 460 and the execution of the ML-based classification process may be terminated prior to the completion of the ML-based classification process. For example, control instructions may be programmatically generated that terminate the ML-based classification process. The control instructions may be further configured to cause the camera device to return to the low-power state (action 470). In the low-power state (e.g., first operation mode 140a), the PIR sensor may monitor for motion, but the camera device 120 may not be powered to capture images.

Figure 5:
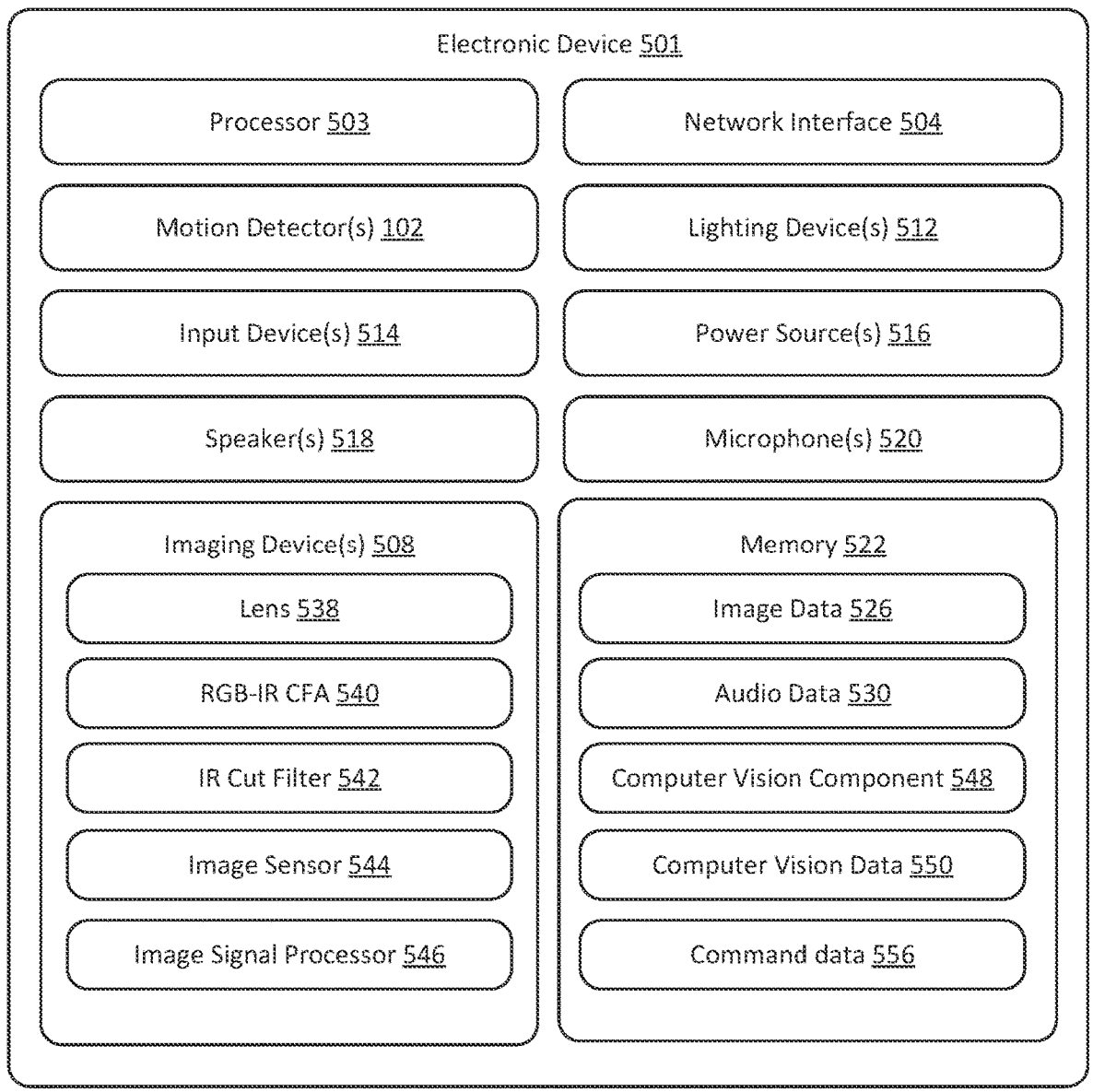
FIG. 5 depicts an example device that may implement one or more motion detectors, in accordance with various aspects of the present disclosure.

FIG. 5 depicts an example device that may implement a motion detector, in accordance with various aspects of the present disclosure. As shown, the electronic device 501 may include one or more processors 503, one or more network interfaces 504, one or more motion detectors 102, one or more imaging devices 508, one or more lighting devices 512, one or more input devices 514, one or more power sources 516, one or more speakers 518, one or more microphones 520, and memory 522. In various examples, the electronic device 501 may be an example of a camera device, such as camera device 120 shown and described in reference to FIG. 1. It should be noted that the various components depicted for electronic device 501 are merely examples of components that may be included in a device with which motion detectors 102 and/or the techniques described herein may be used. Additional, fewer, and/or different components may be used in accordance with the desired implementation.

As described herein, the motion detector 102 may include one or more (alone or in combination) different types of motion sensors. For example, in some embodiments, the motion detector 102 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 503, for example, to one or more threshold voltage values to determine if the amount of voltage in the output signal is indicative of motion, and/or if the amount of voltage in the output signal is indicative of motion of an object that is to be captured by the imaging device(s) 508. In some examples, the processor(s) 503 may determine the distance based on the amount of voltage in the output signal. Additionally, or alternatively, in some examples, the processor(s) 503 may determine the distance based on which motion sensor 102 detected the object.

Although the above discussion of the motion detector 102 primarily relates to PIR sensors, depending on the example, the motion detector 102 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type radio frequency motion sensor, the output signal may include Doppler shift data from an ultrasonic-type motion sensor, the output signal may include radio wave disturbance from a tomographic-type motion sensor, and/or the output signal may include other data types for other sensor types that may be used as the motion detector 102. In at least some examples, the motion detector 102 may include PIR sensor 130. In some examples, the motion detector may include a radar sensor including a transmitter, two or more receivers (e.g., with corresponding antennas), a mixer, an ADC, and/or other electronics configured to perform the various operations described herein. In various examples, circuitry may be included in the electronic device 501 and/or in the image signal processor 546 that may be effective to perform the various motion detection techniques described herein. In various examples, a PIR sensor, radar sensor, or other motion sensor may be used to perform coarse motion detection (e.g., in first operation mode 140*a*). Once the PIR sensor or other motion sensor is triggered, other motion sensing techniques (e.g., the motion detection techniques described above) and/or ML-based object detection) may be triggered (e.g., in second operation mode 140*b*). In various examples, the motion detector 102 may include logic to compare two or more frames of image data as an implementation of inter-frame comparison motion detection (e.g., non-computer vision-based motion detection 300) while operating in second operation mode 140*b*.

An imaging device 508 may include any device that includes an image sensor 544, such as a charge-coupled device (CCD) and/or an active-pixel sensor (CMOS sensor), that is capable of generating image data 526 (which may represent, and/or include, the frames of image data described herein), representing one or more images (e.g., a video). The imaging device 508 may include a lens 538 that is effective to focus light on the image sensor 544. The light may be filtered by an RGB color filter array (CFA) 540 (e.g., a Bayer CFA) or an RGB-IR CFA. In one aspect of the present disclosure, the image sensor 544 may comprise a complementary metal-oxide semiconductor (CMOS) array and may be capable of recording high definition (e.g., 722p, 1800p, 4K, 8K, etc.) image and/or video files. The image sensor 544 may comprise a plurality of photosensors that may transform light into electrical signals. Such electrical signals may be represented by numerical values (e.g., floating point numbers) that may be processed using the image signal processor 546. Each photosensor of the image sensor 544 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 508 are in night mode. In some examples, the electronic device 501 may include an IR cut filter 542 to filter out infrared light from the light path of the photosensors when the electronic device 501 is configured in day mode. The IR cut filter 542 may be removed from the light path such that infrared light may reach the photosensors when the electronic device 501 is configured in night mode. In various examples, the electronic device 501 may account for IR light detection for accurate color reproduction using image processing techniques without using an IR cut filter 542.

The imaging device 508 may include a separate image signal processor 546, or the processor(s) 503 may perform the camera processing functionality. The processor(s) 503 (and/or camera processor) may include an encoding and compression chip. In some embodiments, the processor(s) 503 (and/or the camera processor) may comprise a bridge processor. The processor(s) 503 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 503 (and/or the camera processor). For example, in certain embodiments the camera memory may comprise synchronous dynamic random-access memory (SD RAM).

The lighting device(s) 512 may be one or more light-emitting diodes capable of producing visible light and/or infrared light when supplied with power (e.g., to enable night vision). In some embodiments, when activated, the lighting device(s) 512 illuminates a light pipe. In some examples, the electronic device 501 uses the lighting device(s) 512 to illuminate specific components of the electronic device 501, such as the input device(s) 514. This way, users are able to easily see the components when proximate to the electronic device 501. The lighting device(s) 512 may include an infrared-light light emitting diode (LED), a visible-light LED, etc. In various examples, the electronic device 501 may include an ambient light sensor that may be used to transition the electronic device 501 and/or a camera thereof between day and night mode.

An input device 514 may include, but is not limited to, a button, a touch-sensitive surface, a switch, a slider, and/or any other type of device that allows a user to provide input to the electronic device 501. For example, if the electronic device 501 includes a doorbell, then the input device 514 may include a doorbell button. In some examples, based on receiving an input, the processor(s) 503 may receive a signal from the input device 514 and use the signal to determine that the input device 514 received the input. Additionally, the processor(s) 503 may generate input data representing the input received by the input device(s) 514. For example, the input data may represent the type of input (e.g., a push to a button), a time that the input occurred, and/or the like. In at least some examples, the electronic device 501 may be a video-enabled doorbell.

The power source(s) 516 may include one or more batteries that provide power to the electronic device 501. However, in other examples, the electronic device 501 may not include the power source(s) 516. In such examples, the electronic device 501 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 518 may be any electromechanical device capable of producing sound in response to an electrical signal input. The microphone(s) 520 may be an acoustic-to-electric transducer or sensor capable of converting sound waves into audio data 530 representing the sound. The speaker(s) 518 and/or microphone(s) 520 may be coupled to an audio CODEC to enable digital audio received by user devices to be decompressed and output by the speaker(s) 518 and/or to enable audio data captured by the microphone(s) 520 to be compressed into digital audio data 530. In some examples, the electronic device 501 includes the speaker(s) 518 and/or the microphone(s) 520 so that the user associated with the electronic device 501 can communicate with one or more other users located proximate to the electronic device 501. For example, the microphone(s) 520 may be used to generate audio data representing the speech of the one or more other users, which is then sent to the camera device. Additionally, the speaker(s) 518 may be configured to output user speech of the user, where the user's user speech may also be represented by audio data 530.

In some examples, the electronic device 501 determines that the start of the video is the first frame of the video. In some examples, such as when the electronic device 501 continuously generates the image data (e.g., the electronic device 501 does not turn off the imaging device(s) 508), the start of the video corresponds to the portion of the video that the imaging device(s) 508 were generating right after detecting an event. For example, the start of the video may correspond to the first frame of the video after detecting the event. In other examples, such as when the electronic device 501 does not continuously generate the image data 526 (e.g., the electronic device 501 turns off the imaging device(s) 508 until detecting an event such as a motion event (e.g., a motion event detected by PIR sensor 130)), the start of the video corresponds to the first frame of the video that is generated by the imaging device(s) 508.

As further illustrated in the example of FIG. 5, the electronic device 501 may include the computer-vision component 548. The computer-vision component 548 may be configured to analyze the image data 526 using one or more computer-vision techniques and output computer-vision data 550 based on the analysis. The computer-vision data 550 may represent information, such as the presence of an object represented by the image data 526, the type of object represented by the image data 526, locations of the object relative to the electronic device 501, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 550 may further represent a bounding box indicating the respective location of each object represented by the image data 526. In various examples, the computer-vision component 548 may implement the ML-based object detection techniques described herein, such as the ML-based object detector 200 of FIG. 2.

For example, the computer-vision component 548 may analyze the image data 526 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 548 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 548 may be used to evaluate cropped activity zones in which motion has been detected using the motion detection techniques described herein. In various examples, upon detecting an object of interest in the cropped activity zone, the electronic device may begin encoding and transmitting captured video to one or more remote devices. As previously described, in various examples, ML-based object detection processing may be terminated prior to completion if an auxiliary motion detection pipeline performed at least partially in parallel returns a negative result indicating no motion. For example, if inter-frame comparison motion detection is initiated in parallel with the ML-based object detector, and the inter-frame comparison motion detection (or other non-ML-based motion detection) indicates that no motion is detected, the ML-based object detector may be terminated and the device may be transitioned back to a low-power state (e.g., sleep mode).

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 548 may use object detection technique(s) that use computer-vision analysis to perform informative region selection, features extraction, and then classification of object(s) represented by the image data 526. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like. In various examples, the inter-frame comparison techniques described herein may be embodied in logic stored in memory 522.

The electronic device 501 may also store command data 556. In some circumstances, a user of the electronic device 501 may want to receive a live view from the electronic device 501. The command data 556 may represent an identifier associated with the electronic device 501, a command to generate the image data 526, a command to send the image data 526, and/or the like. In some examples, the electronic device 501 may then analyze the command data 556 and, based on the identifier, determine that the command data 556 is directed to the electronic device 501. For example, the electronic device 501 may match the identifier represented by the command data 556 to an identifier associated with, and stored by, the electronic device 501. Additionally, the electronic device 501 may cause the imaging device(s) 508 to begin generating the image data 526 (e.g., if the imaging device(s) 508 are not already generating the image data 526) and send the image data 526 to the one or more computing devices implementing the motion detector 102, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Among other potential benefits, a system in accordance with the present disclosure may conserve power consumption by reducing video capture, image capture, and/or streaming from wireless camera devices resulting from insignificant motion and/or false triggering of a motion detector. For example, detection of motion by a motion sensor of a battery-powered camera device may be used to trigger video capture and/or streaming by the camera device. However, as described herein, motion sensors may be triggered by insignificant motion, such as ceiling fans, pets, wind blowing various objects, passing cars, etc. Accordingly, the battery (e.g., a removable battery pack) of a battery-powered camera device may be drained at an increased rate due to capture of such insignificant events. Additionally, unwanted notifications may be sent to a user of the camera system related to the insignificant motion triggers. Accordingly, as described herein, using a multi-staged approach whereby a PIR sensor is used to initiate image capture, followed by parallel ML-based object detection and non-ML-based motion detection processing. If the non-ML-based motion detection processing returns a negative result indicating no motion, the ML-based object detection processing may be terminated prior to completion and the camera device may be returned to a low-power state to conserve battery power. Conversely, if the non-ML-based motion detection processing returns a positive result indicating motion, the ML-based object detector processing may be allowed to complete to determine if an object of a pre-specified class (e.g., a human, car, or other relevant object) is detected. Parallel processing of the ML-based object detector and the non-ML-based motion detection may allow a user to see video of the motion event sooner relative to serial processing where ML-based object detection is conditioned on a positive motion result from another motion sensor. Accordingly, the techniques described herein may result in significantly longer battery life of wireless camera devices, while also providing lower latency video and/or images.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A camera device comprising:
   a camera;
   a passive infrared sensor;
   one or more processors;
   one or more computer readable media containing computer executable instructions that, when executed by the one or more processors, cause the camera device to perform operations comprising
      determining that the passive infrared sensor has detected first motion,
      based on the determining that the passive infrared sensor has detected first motion,
         initiating, by the camera device, execution of a motion verification process that analyzes frames captured by the camera for pixel differences, and
         initiating, by the camera device, execution of a classification process that analyzes frames captured by the camera utilizing a machine learning model,
      determining, based on the motion verification process, that the first motion is not verified; and
      terminating, based on the determining that the first motion is not verified, execution of the classification process prior to completion of the classification process.

2. The camera device of claim 1, wherein the one or more computer readable media contain computer executable instructions that, when executed by the one or more processors, cause the camera device to perform operations comprising:
powering the camera in a first power state to capture two or more frames of image data used during at least one of the motion verification process and the classification process; and
after terminating execution of the classification process, powering the camera in a second power state, wherein the second power state is associated with lower power consumption relative to the first power state.

3. The camera device of claim 1, wherein the one or more computer readable media contain computer executable instructions that, when executed by the one or more processors, cause the camera device to perform operations comprising:
based on the initiating of execution of the motion verification process,
determining a first average pixel value for a first pixel type for a first zone of a first frame represented by first image data captured by the camera,
determining a second average pixel value for the first pixel type for the first zone of a second frame represented by the first image data,
determining a difference between the first average pixel value and the second average pixel value, and
comparing the difference to a threshold.

4. A method comprising:
based on first motion detection by a camera device,
initiating, by the camera device, execution of a non-machine-learning-based (non-ML-based) motion verification process, and
initiating, by the camera device, execution of a machine-learning-based (ML-based) classification process, wherein at least a portion of the ML-based classification process is executed during the execution of the non-ML-based motion verification process;
determining, by the non-ML-based motion verification process based on first image data generated by a camera of the camera device, that the first motion detection is not verified; and
terminating execution of the ML-based classification process based on the determining that the first motion detection is not verified.

5. The method of claim 4, wherein the method comprises, based on the initiating of execution of the non-ML-based motion verification process,
determining a first average pixel value for a first pixel type for a first zone of a first frame represented by the first image data,
determining a second average pixel value for the first pixel type for the first zone of a second frame represented by the first image data,
determining a difference between the first average pixel value and the second average pixel value, and
comparing the difference to a threshold.

6. The method of claim 4,
wherein the first motion detection comprises detecting, by a passive infrared (PIR) sensor, motion in an environment.

7. The method of claim 6, further comprising causing the camera device to transition from a low-power state to a high-power state based on the detecting the motion by the PIR sensor.

8. The method of claim 4, further comprising, based on the determining that the first motion detection is not verified, transitioning the camera device to a low-power state in which the camera of the camera device does not capture image data.

9. The method of claim 4, wherein the non-ML-based motion verification process comprises:
determining a first frame of image data captured by the camera device;
determining a second frame of image data captured by the camera device;
determining at least one difference between the first frame of image data and the second frame of image data; and
determining first result data based at least in part on the at least one difference.

10. The method of claim 9, wherein the determining the at least one difference comprises:
determining a first representative pixel value for a first block of pixels of the first frame of image data;
determining a second representative pixel value for a second block of pixels of the second frame of image data, wherein the second block of pixels is at a location in the second frame that corresponds to a location of the first block of pixels in the first frame; and
determining a difference value between the first representative pixel value and the second representative pixel value.

11. The method of claim 4, wherein the ML-based classification process comprises:
providing first image data captured by the camera device as input to a first convolutional neural network;
generating, using the first convolutional neural network, embedding data representing the first image data; and
determining, using a machine learning classifier, that the embedding data corresponds to a person represented in the first image data.

12. The method of claim 4, wherein the execution of the computer vision-based classification process and the execution of the non-computer vision-based motion detection process are triggered in parallel based on detection of motion by a passive infrared (PIR) sensor.

13. The method of claim 4, further comprising:
determining first result data prior to completion of the computer vision-based classification process; and
switching to a low-power state after the terminating the execution of the computer vision-based classification process.

14. The method of claim 4, wherein the method comprises receiving, from a remote computing device, zone data indicating a portion of a camera field of view,
determining that a first zone is within the portion of the camera field of view,
determining a first average pixel value for a first pixel type for the first zone of a first frame represented by the first image data,
determining a second average pixel value for the first pixel type for the first zone of a second frame represented by the first image data,
determining a difference between the first average pixel value and the second average pixel value, and
comparing the difference to a threshold.

15. A camera device comprising:
a camera;
one or more processors;
one or more computer readable media containing computer executable instructions that, when executed by the one or more processors, cause the camera device to perform operations comprising
- based on first data indicating that motion has been detected,
  - initiating, by the camera device, execution of a first motion verification process, and
  - initiating, by the camera device, execution of a second motion verification process that utilizes a machine learning model,
- determining, based on the first motion verification process, that motion is not verified; and
- terminating, based on the determining that motion is not verified, execution of the second motion verification process prior to completion of the second motion verification process.

16. The camera device of claim 15, wherein the camera device comprises
- a passive infrared (PIR) sensor; and
- wherein the first data is data generated based on the PIR sensor.

17. The camera device of claim 15, wherein the camera device comprises a wireless interface, an ambient light sensor, a visible-light light emitting diode, an infrared-light light emitting diode, and an infrared cut filter.

18. The camera device of claim 15, wherein the camera device further comprises a neural network accelerator effective to execute the second motion verification process.

19. The camera device of claim 15, wherein the camera device is a video doorbell.

20. The camera device of claim 15, wherein the one or more computer readable media contain computer executable instructions that, when executed by the one or more processors, cause the camera device to perform operations comprising:
- powering the camera in a first power state to capture two or more frames of image data used during at least one of the first motion verification process and the second motion verification process; and
- after terminating execution of the second motion verification process, powering the camera in a second power state, wherein the second power state is associated with lower power consumption relative to the first power state.

21. The camera device of claim 15, wherein the camera device comprises
- a passive infrared (PIR) sensor; and
- first circuitry configured to power the camera in a first power state when the PIR sensor detects motion.

\* \* \* \* \*